Figure 1:
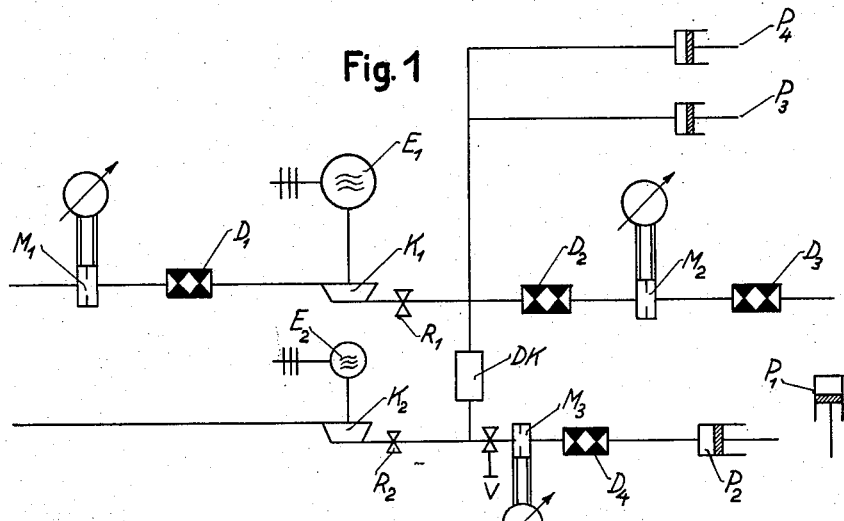

Sept. 15, 1959   L. ENGEL ET AL   2,904,076
PULSATION DAMPENER
Filed Oct. 16, 1956

INVENTORS:
L. Engel
H. Panzer
By Lowry & Rinehart
ATTYS.

United States Patent Office 2,904,076
Patented Sept. 15, 1959

2,904,076

PULSATION DAMPENER

Ludolf Engel and Herbert Panzer, Clausthal-Zellerfeld, Germany; said Panzer assignor to said Engel Application October 16, 1956, Serial No. 616,187

Claims priority, application Germany October 22, 1955

2 Claims. (Cl. 138—26)

It is well known in the art to carry out measurements of the rate of flow of gas currents on the basis of the known rate of flow equation in such a manner that, with the aid of a stem pressure device, for example in the form of a pilot tube or a standard orifice, an effective head is produced from which the rate of flow per unit of time is ascertained from the effective head measured on the stem pressure device. This known method of measuring only gives useful results in the case of steady flow, that is in the case of an effective head invariable with time.

If pulsations occur in the flow as a result of which the effective head is subject to variations with time, the known effective head measuring method is no longer suitable for determining the rate of flow reliably and with sufficient accuracy. For, even by strongly stemming the current in a measuring device, it is not possible to find the mean of the root of the effective head variable with time, necessary for determining the rate of flow per unit of time. The measuring device only indicates the arithmetic mean value corresponding to a too high rate of flow per unit of time.

To eliminate the difficulties in measuring and inaccurate measurements due to the pulsation of gas currents the present invention deals with the hitherto unsolved problem and has for its object to provide an efficient method and apparatus for measuring the rate of flow of pulsating gas currents in a simple manner, using an effective head producer of known type, which method comprises the steps of bringing within a flow device the gas current from sonic speed to supersonic speed at least on one side of at least one effective head producer, and subsequently retarding the gas current to subsonic speed, at the same time recovering pressure.

The changing of the type of speed of the gas flow in front of or behind or on both sides of a measuring point or instrument causes a smoothing of the flow to such an extent that an effective head constant in time is set up in the flow measuring device or volumeter, because disturbances (pulsations) which tend to spread to the volumeter from one or both sides thereof are kept away from the measuring point. This is attributable to the known physical phenomenon that the speed of propagation of disturbances is equivalent to the speed of sound and, consequently, the disturbances do not penetrate the supersonic speed range. The effective head invariable with time which we produce at the measuring point and which represents the mean of the root of the effective head of the pulsating gas flow variable with time, enables the rate of flow of the pulsating gas current per unit of time, to be ascertained without further ado just as in the case of measuring the effective head of steady currents. Following the supersonic zone of the flow device, the speed energy of the flowing gas is reconverted into head or pressure energy to enable the gas, once again compressed, to be utilized for performing work, in spite of having been previously expanded.

Another advantageous measure of isolating the measuring point against disturbances which surge in the gas flow against the measuring instrument, consists in that the disturbances are caught by a reflector which at least partly absorbs the disturbances and reflects them so that the deflected disturbances, being fed back, exert a damping effect on the currents running in the opposite direction and spreading towards the measuring instrument.

The apparatus for carrying out the measuring method according to the invention comprises at least one flow device with the special characteristic that this flow device consists of a Laval nozzle and a double diffusor connected directly therewith.

Figure 2:
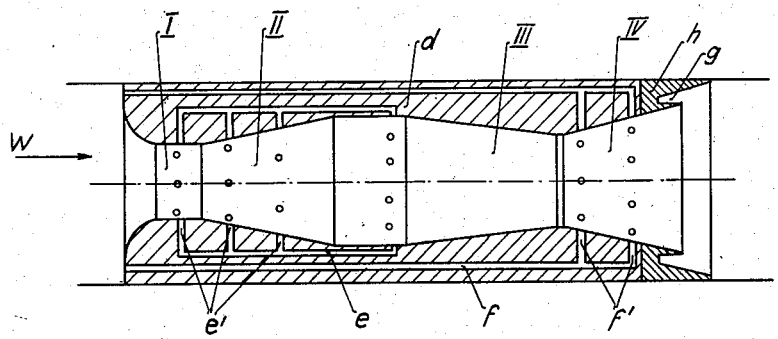

Other details of the construction of the flow device are hereinafter described by way of example, with reference to the accompanying drawing, in which:

Fig. 1 is a diagrammatic view showing the application of an apparatus according to the invention, and Fig. 2 is a semi-diagrammatic view showing in longitudinal section a flow device constructed for carrying out the method according to the invention.

The disturbances (pulsations) in a gas current can emanate either from a head or pressure producer or from a consumer or simultaneously from both. It is possible to connect several pressure producers with one consumer, one pressure producer with several consumers, or several pressure producers with several consumers by means of a pipe network. The disturbances emanating therefrom singly may overlap.

For measuring the rate of flow per unit of time of compressed gas produced by a single compressor or pressure producer or of the compressed gas used by a single pressure consumer or of the compressed gas produced or used by several simultaneously driven pressure producers or consumers connected up in a common line, the apparatus for carrying out our new measuring method can be connected up to a stem pressure device serving for ascertaining the effective head, either in front of or behind or both in front of and behind the same, according to the position of a source of disturbance.

According to the example of application illustrated in Fig. 1, it is intended to show one amongst many other possible measuring arrangements.

A compressed air network is fed by two piston compressors $K_1$ and $K_2$ which are independently driven by electric motors $E_1$ and $E_2$. Four consumers, for example pneumatic tools, $P_1$, $P_2$, $P_3$, and $P_4$ which also cause pulsations, are connected up to the compressed air network. The working pressure prevails in an interposed air pressure tank or header $D_K$. Two check valves $R_1$ and $R_2$ as well as a stop valve V are also connected up with the compressed air network.

Measurements are to be taken of the quantity of air sucked in by the piston compressor $K_1$ at a measuring point $M_1$, of the air used by the consumer $P_1$ at a measuring point $M_2$, and of the quantity of air used by the consumer $P_2$, after the piston compressors $K_1$ and $K_2$ and consumers $P_1$, $P_3$, $P_4$ have been switched off, at a measuring point $M_3$.

The disturbances (pulsations) emanating from the piston compressor $K_1$ are screened off by a flow device $D_1$ for carrying out our new measuring method, from the measuring point $M_1$ which indicates the effective head of the sucked-in air.

The disturbances (pulsations) caused by the two piston compressors $K_1$ and $K_2$ and by the consumers $P_3$ and $P_4$ connected up to the common compressed air network ($P_2$ is cut out), are screened off by a flow device $D_2$ and the pulsations emanating from the consumer $P_1$ are screened off by a corresponding flow device $D_3$ from the measuring point $M_2$ which indicates the effective head of the compressed air consumed by the consumer $P_1$.

When the piston compressors $K_1$ and $K_2$ and the consumers $P_1$, $P_3$ and $P_4$ are stopped, compressed air is withdrawn from the pressure tank $D_K$ and, after the stop valve V has been opened, is fed to the consumer $P_2$. The disturbances (pulsations) coming from the consumer $P_2$ are screened off by a flow device $D_4$ from the measuring point $M_3$ which indicates the effective head of the compressed air fed to the consumer $P_2$.

Effective heads constant in time are attained at the measuring points $M_1$, $M_2$ and $M_3$ by keeping away therefrom any disturbances by the flow devices which accelerate the gas flow to supersonic speed by lowering the static pressure, and by subsequently retarding the flow once more to subsonic speed, at the same time reconverting kinetic energy into pressure energy.

Each of the flow devices consists of a housing or body $d$ forming an overcritically operating double nozzle, as can be seen from Fig. 2. The forward portion of said double nozzle, into which pulsating gas or an air current enters in the direction of arrow W, is constructed like a Laval nozzle with a narrowing section I and a gradually widening section II. A supersonic diffusor III is connected to the Laval nozzle and a subsonic diffusor IV to the supersonic diffusor III. In the narrowest cross-sectional part of the Laval nozzle sonic speed occurs and in the section II following thereon, supersonic speed. The reconversion of the speed energy into pressure energy takes place in the two diffusors III, IV in the rear part of the double nozzle.

In the nozzle body $d$, which surrounds both the Laval nozzle sections I and II and also the diffusors III and IV, passages $e$, $f$ extend parallel to the longitudinal central axis thereof.

Transverse passages $e'$ branch off from the passages $e$ extending over the zones of the sonic and supersonic speed and closed at both ends, and have outlets distributed in a certain manner over the inner wall of the Laval nozzle. The passages $f$, extending along almost the entire length of the nozzle body $d$, are open at the front end of the nozzle body facing the gas current and communicate with transverse passages $f'$ which have their outlet in the inner wall of the diffusor IV within the zone of the subsonic speed. The system of passages $e$, $e'$ serves for sucking off any occurring boundary layer in the zones of sonic and supersonic speed, that is compel this layer to bear against the nozzle wall, and the system of passages $f$, $f'$ serves for disturbing the boundary layer in the subsonic zone, that is allow it to detach itself or loosen.

This stabilizing and disturbance of the boundary layer causes the flow to be adjusted in the individual sections of the double nozzle to the required form and the desired transitions.

At the outlet end of the nozzle body $d$ in the direction of flow, the end wall facing the disturbance side is provided with an annular hollow space $g$ in the zone of the last portion of the subsonic diffusor section IV, formed either by fitting a suitably shaped body $h$ on the nozzle body $d$ or by turning or milling out the end wall thereof. This hollow space $g$ catches a portion of the disturbances surging towards the flow device, in that it partly absorbs them and partly reflects them in the direction of the source of disturbance. The reflected disturbances then in turn exert a damping effect on the freshly arriving disturbances.

Should the flow device be required to catch disturbances coming from both sides, it is advisable also to fit or form at the front end of the nozzle body $d$ directed towards the direction of flow of the gas, an annular hollow space $g$ likewise acting as disturbance reflector. In what arrangement and construction the flow devices should be used in the individual cases in order to fulfil their purpose of keeping the disturbances in flow away from the measuring points in the best possible manner, should be easily discernable from the example of application illustrated in Fig. 1.

While the method herein described, and the form of apparatus for carrying this method into effect constitute preferred embodiments of the invention, it is to be understood that the invention is not limited to this precise method and form of apparatus, and that changes may be made in either without departing from the scope of the invention which is defined in the appended claims.

We claim:

1. A pulsation dampener device of the type described for use in combination with a device for measuring the flow of pulsating currents of gaseous material, comprising a nozzle body disposed in the path of flow of a pulsating current of gaseous material, said body being provided between the exit and entry ends thereof with a series of aligned and substantially contiguous openings of differing cross-sectional areas, whereby said body starting at the entry end will be provided with a first opening of gradually decreasing cross-section, a second opening of gradually increasing cross-section, a third opening of gradually diminishing cross-section and a fourth opening of gradually increasing cross-section, said openings also being of such a configuration, whereby as said gaseous material passes through the said openings the rate of flow of the gaseous material will be first brought to sonic speeds and then raised to supersonic speeds and finally reduced to subsonic speeds, said nozzle body also being provided with means for stabilizing the flow of gaseous material therethrough, and at least one end of the nozzle body being provided with means for absorbing and reflecting disturbing pulsations in the current of gaseous material away from the nozzle body and the main current of gaseous material flowing through the nozzle body.

2. The device as set forth in claim 1 wherein said absorbing and reflecting means comprises an end surface of the nozzle body milled out to form an annular hollow space therein.

References Cited in the file of this patent

UNITED STATES PATENTS

| | | |
|---|---|---|
| 1,578,682 | Raymond | Mar. 30, 1926 |
| 2,709,917 | Bruynes | June 7, 1955 |
| 2,729,974 | Lee et al. | Jan. 10, 1956 |
| 2,763,291 | Snyder | Sept. 18, 1956 |
| 2,795,374 | Isakoff | June 11, 1957 |

FOREIGN PATENTS

| | | |
|---|---|---|
| 521,143 | Great Britain | Apr. 11, 1939 |

OTHER REFERENCES

A publication entitled Wanted: An Effective Pulsation Dampener by Eric J. Lindahl, in The Oil and Gas Journal, May 17, 1954, pages 108–110. (Copy in Scientific Library of U.S. Patent Office.)